United States Patent [19]

Hillary et al.

[11] Patent Number: 4,729,533

[45] Date of Patent: Mar. 8, 1988

[54] SUPPORT APPARATUS

[75] Inventors: Christopher J. Hillary, Eastleigh; John V. Pike, Winchester, both of England

[73] Assignee: International Business Machines Corporation, Armonk, N.Y.

[21] Appl. No.: 30,514

[22] Filed: Mar. 27, 1987

[30] Foreign Application Priority Data

Apr. 19, 1986 [GB] United Kingdom ................ 8609613

[51] Int. Cl.⁴ ............................................ F16M 11/12
[52] U.S. Cl. .................. 248/184; 248/123.1; 248/1 G; 248/1 C; 108/6
[58] Field of Search ............... 248/558, 562, 564, 580, 248/583, 584, 585, 591, 592, 593, 595, 596, 598, 631, 660, 123.1, 371, 162.1, 157, 421, 178, 184, 185, 284, 1 C, 1 F, 1 H, 1 I; 108/6, 7

[56] References Cited

U.S. PATENT DOCUMENTS

| 2,432,554 | 12/1947 | Knoedler | 248/585 |
| 2,557,608 | 6/1951 | Mast | 248/585 |
| 2,941,776 | 6/1960 | Lauterbach | 248/284 |
| 3,000,606 | 9/1961 | Storm | 248/284 |
| 3,298,654 | 1/1967 | Dome | 248/631 |
| 3,314,672 | 4/1967 | Persson | 248/585 |
| 3,436,046 | 4/1969 | Valeska | 248/284 |
| 4,691,886 | 9/1987 | Wendling | 248/178 |

FOREIGN PATENT DOCUMENTS

| 721162 | 11/1965 | Canada | 248/585 |
| 2002125 | 7/1970 | Fed. Rep. of Germany | 248/564 |
| 2847135 | 5/1980 | Fed. Rep. of Germany | . |
| 1319292 | 4/1962 | France | 248/585 |

Primary Examiner—J. Franklin Foss
Assistant Examiner—Robert A. Olson
Attorney, Agent, or Firm—Jack M. Arnold

[57] ABSTRACT

A support for an object of appreciable weight (e.g., for a CRT display) comprises a mount 10 which, in use is located at a reference height. A crank 20 extends from this mount. A boom 12 is pivotally mounted on the mount and extends therefrom to and carries means (not shown) for attaching the intended object which is to be located at an adjustable height with respect to the reference height. A lift lever 26 and a gas strut 30 are carried wholly by the boom. A lift rod 36 is mounted between a position on the crank remote from the mount/boom axis 18 and the lift lever, the latter being pivotally mounted in the boom. The lift rod and the gas strut are connected to the lift lever, but with the strut at a greater separation from the lever's pivot than the rod. The gas strut engages the boom and counteracts the effects of gravity on the loaded support. In addition to the lift mechanism, the support can also incorporate a parallel motion and a tilt mechanism.

47 Claims, 20 Drawing Figures

SUPPORT APPARATUS

DESCRIPTION

Technical Field

The present invention relates to a support for locating an object (or objects) of appreciable weight at an adjustable height.

Background Art

There are a number of applications in which it is desirable to locate an object of appreciable weight at any height within a given range and to have it remain in position using a passive mechanism without the need for locking mechanisms which bear a substantial portion of that weight. One such application is the mounting of visual display units such as cathode ray tube (CRT) displays. For ergonomic reasons it is desirable to provide such displays with means for adjusting the height at which the screen is located so as to accommodate various users, lighting conditions, workstation layouts, etc. Other such applications in an office environment would be the supporting of a drawing board, or of a complete workstation with keyboard and display.

If the weight of the object is negligible, the general stiffness of the mechanism will be sufficient to locate if not to preserve attitude, but, even with an apparently light item such as a CRT, the weight involved can typically be within the range of 8 Kg to 30 Kg for a single display.

A prior art support for a CRT display described in No. DE-B-2847135 comprises a base mount, a boom pivotally mounted at its lower end to the base member, and means for attaching the display at the other end of the boom. In order to counteract the weight of the display, a torsion spring is provided at the lower pivot point of the lift boom to bias it towards its raised position. In view of the high lifting forces needed, it is necessary to use relatively large and bulky torsion springs in the support. Also, due to the characteristic of a spring, there is a tendency for too high a lifting force to be provided at the lower positions of the boom and an insufficient lifting force to be provided at upper boom positions.

It is also known to use one or more gas struts to provide the required lifting force. Typically, in prior lifting apparatus, the gas struts have provided a direct lifting force.

In one type of arrangement, the gas struts have been mounted vertically and the display is moved up and down on the struts. This vertical arrangement has the major disadvantage that a low positioning of the screen can only be achieved if the lifting mechanism is mounted externally to the display, which increases the disk space or footprint needed, or if it penetrates the display itself, which makes for a more complicated design.

A second type of arrangement using gas struts can be compared to a support which uses torsion springs such as that shown in the aforementioned DE-B-2847153. In the arrangements of this second type, a gas strut has been directly connected between the base mount and the boom in such a way as to bias the boom into its raised position. The use of a boom does provide a greater range of available heights compared to the vertical motion arrangement, but because of the direct action, both types of arrangement require the use of powerful and bulky gas struts, which result in relatively bulky supports. Prior gas strut arrangements also suffer from the problem of providing the correct amount of lift throughout the full range of lift heights.

These prior arrangements all suffer from the disadvantage of requiring powerful biasing means which means that the assembly and/or repair of the apparatus is potentially hazardous and that the supports are commensurately bulky and expensive. In addition, even in the lowest position, the equipment is still at a substantial distance above the desk.

DISCLOSURE OF THE INVENTION

The disadvantages of the prior art are overcome by the support in accordance with the present invention. This support comprises a mount which, in use, is located at a reference height. A crank extends from this mount. A boom is pivotally mounted on the mount and extends therefrom to and carries means for attaching the object which is to be located at an adjustable height with respect to the reference height. A lift lever and a gas strut are carried wholly by the boom. A lift rod is mounted between a position on the crank remote from the mount/boom axis and the lift lever, the latter being pivotally mounted in the boom about a lift lever/boom axis fixed relative to the boom. The lift rod and the gas strut are pivotally connected to the lift lever, but with the strut at a greater separation from the lift lever/boom axis than the rod. The gas strut engages the boom and counteracts the effects of gravity when the support is loaded with the intended object.

The use of the lever mechanism for transferring the force from the gas strut to the crank enables the use of a relatively small and inexpensive gas strut. As a relatively small gas strut is used, and because the lever mechanism need not take up much space either, it is possible to achieve a compact design which allows a large range of vertical adjustment to be achieved. The whole lifting mechanism could be contained out of sight within the boom.

By careful choice of the positions at which the gas strut is connected to the boom and to the lever and the positions at which the lift rod is connected to the base crank, it is possible to make optimum use of the gas strut characteristics so as to provide the correct lifting force needed over the full range of vertical display positions. It is also possible, with a single basic design, to accommodate objects having a wide range of weights and weight distributions. Flexibility is achieved because of the interchangeability of gas struts having different pressures and can be enhanced by providing a plurality of optional connecting positions for the gas strut and the lift rod.

The support can be provided with a platform for mounting the object on the boom and with a parallel motion linkage so that the platform remains at its original orientation during movement of the boom. This parallel linkage is preferably provided with a tilt mechanism to allow the platform to be set at a desired angle with respect to the base mount. This angle is maintained constant during movement of the boom by the parallel linkage.

BEST MODE OF CARRYING OUT THE INVENTION

Figure 1:
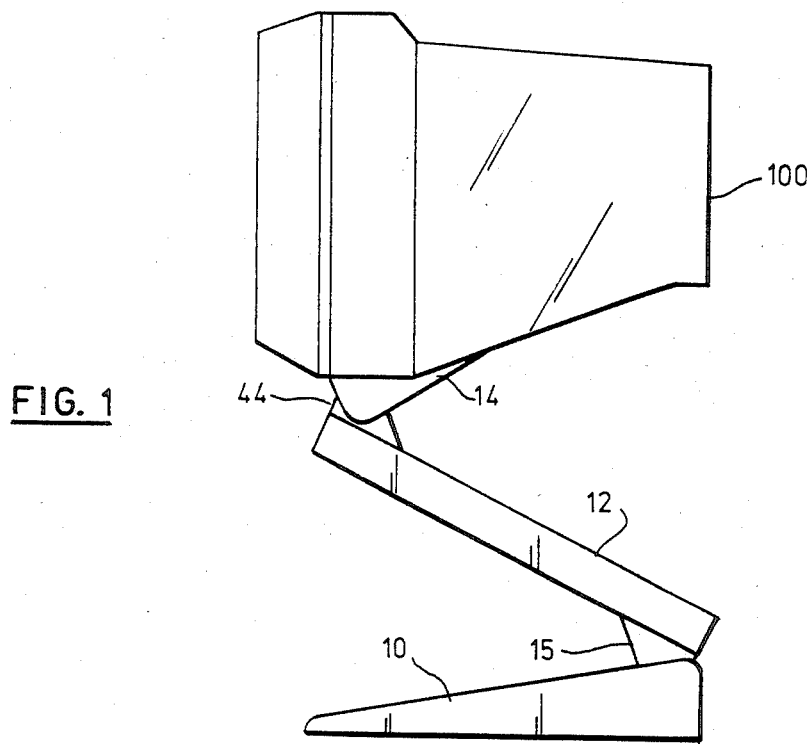
FIG. 1 is a general side view of an embodiment of the invention for supporting a CRT display.

As shown in FIG. 1, a supporting apparatus comprises a mount, or base 10, a boom 12, downward facing lugs 15, upward facing lugs 44 and a platform 14. A CRT display 100 is attached to the platform.

Figure 2:
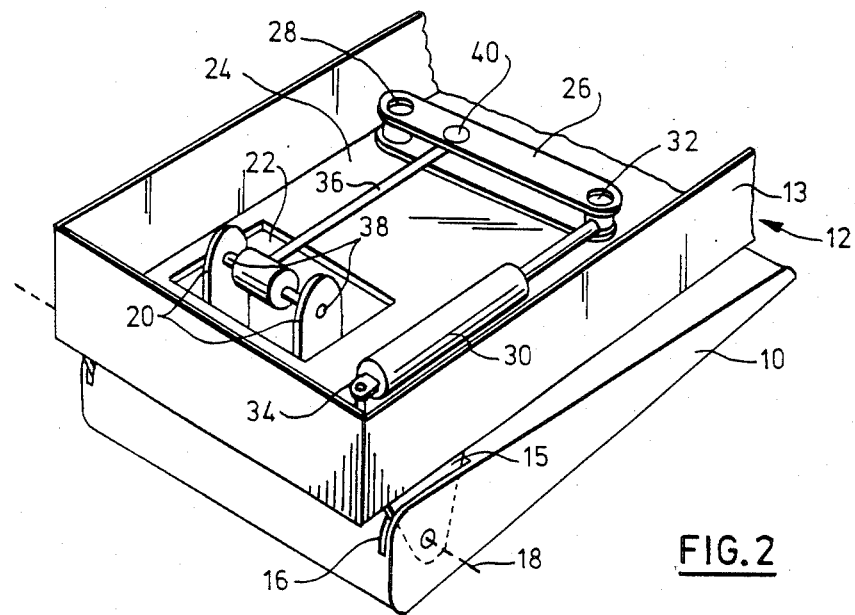
FIG. 2 is an isometric view of part of the support of FIG. 1 including details of the basic lifting mechanism.

As can be seen in FIG. 2, the boom is generally box-shaped in cross-section, and is wider than it is tall. The boom is formed at its lower end with two downward facing lugs 15, one at each side of the lower end of the lift boom. It is by means of these lugs 15, which pass through slots 16 in the base, that the boom is hinged to the mount about an axis 18 which is approximately horizontal in use. The mount is formed with two upward facing lugs, forming a crank 20, which pass through a slot 22 in the lower surface of the boom.

Contained within the casing 13 of the boom is a lift mechanism comprising a lift lever 26, a lift gas strut 30 and a lift rod 36. One end of the lift lever 26 is pivotally mounted in the boom to rotate about an axis 28 at a fixed location in the boom. The gas strut 30 is pivotally connected to a point 32 at the other end of the lift lever 26 and is connected to position 34 in the lift boom. The lift rod 36 is pivotally connected at one end to the crank 20, at a position 38 displaced from the mount/boom axis 18, and is connected at the other end to a point 40 on the lever 26 intermediate the pivot 28 and the connecting point 32 for the gas strut 30. A cover (not shown) for the casing of the boom is provided so that the lift mechanism is concealed within the boom. The cables (not shown) for the CRT display can be carried within the boom casing.

Figure 3A:
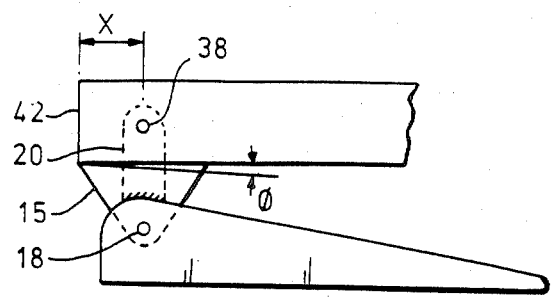
FIGS. 3a and 3b, 4a and 4b, 5a and 5b, 6a, 6b and 6c are used to explain the operation of the lifting mechanism of FIG. 2.
Figure 3B:
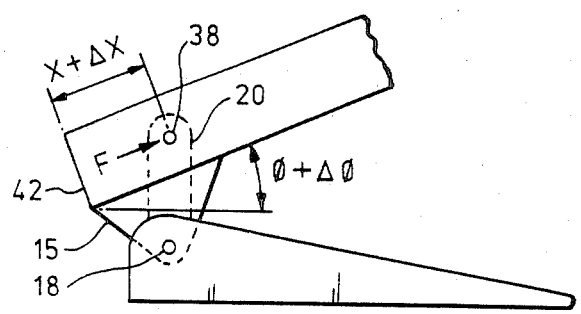

FIGS. 3a and 3b are useful in explaining the operation of the lift mechanism.

In a first position of the boom, at an angle $\phi$ to the horizontal, the distance between the point 38 at which the lift rod 36 is connected to the crank 20 and a predetermined position 42 in the boom, say the end of the boom, is X. In a second position of the boom, at an angle $\phi + \Delta\phi$ to the horizontal, after a rotation $\Delta\phi$ about the mount/boom axis 18, the distance between the point 38 and the predetermined position 42 has increased to $X + \Delta X$. Clearly, if no biasing force is provided to counteract the weight of the display (not shown), mounted at the other end of the boom, the boom will tend to rotate in a clockwise direction (as seen in FIGS. 3a and 3b) about the hinge 18. The gas strut 30, lift lever 26 and lift rod 36 exert a biasing force F between the point 38 and the position 34 at which the gas strut is mounted in the boom, to tend to cause the boom to rotate in a counter-clockwise direction (as seen in FIGS. 3a and 3b) about the hinge 18. The use of an arrangement of gas strut, lift lever and lift rod allows for the biasing force exerted to counter-balance the weight of the display over the complete range of operating heights as explained below.

The relative distances of the connecting points 32 and 40 of the gas strut 30 and the lift rod 36 from the pivot 28 on the lift lever 26 mean that a less powerful gas strut can be used than would be possible if a gas strut were to provide the lifting force directly. Thus the mechanical advantage of the primary linkage comprising the lift lever 26 allows a relatively small and compact gas strut to be used, while the mechanical disadvantage of the boom nevertheless allows for a wide range of heights to be selected for the display.

The advantages of using gas struts rather than springs are manifold. Compared to springs, gas struts can be supplied with a wider range of output forces for a given diameter of barrel size. The range of "rates" (ratio of forces in the compressed, over the extended conditions—thus a gas strut "rated" at 1.5 and 100N would exert 100N when fully extended and 150N when fully compressed) which are obtainable in a given diameter or barrel size is also better than that for springs. Also damping (controlled extension speed) can be provided using gas struts by incorporating a simple valve and/or oil in the barrel.

Figure 4A:
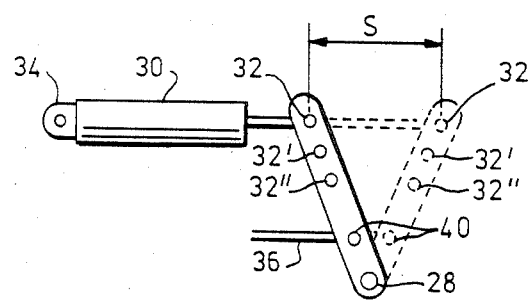
Figure 4B:
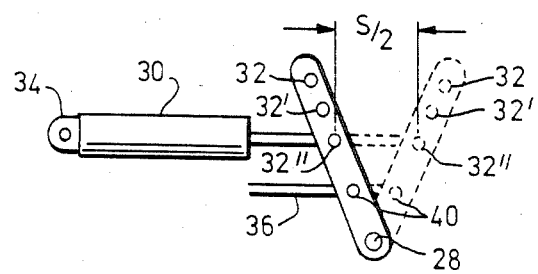

The present invention allows these advantages to be exploited. The point at which the gas strut is connected to the lift lever can be used to adapt the "rate" of the gas strut to the requirements of a particular arrangement. For example, if a gas strut 30 rated at 1.3 is operative over a 100 mm stoke S as shown in FIG. 4a, one can talk of a "system-rate" of 1.3. If, however, the particular display set-up only requires a "system rate" of 1.15, the gas strut can be connected to the lift lever 26 at a position 32" where it is used only 50 mm of its stroke S/2 as shown in FIG. 4b. With this in mind the lift lever could be provided with a plurality of optional connecting points 32, 32', 32" for the gas strut.

Figure 5A:
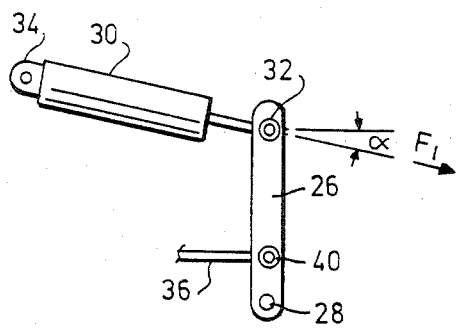
Figure 5B:
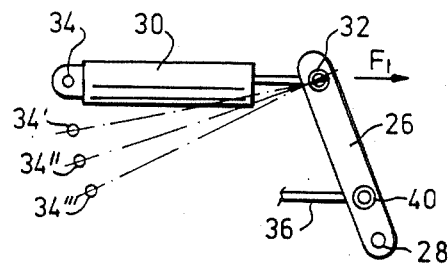

The system performance can also be changed by the selection of the start and finish angles $\alpha$ (FIG. 5a) of the gas strut 30 relative to the lift lever 26 as it rotates about the pivot point 28. The optimum driving force transmission is obtained when the gas strut is perpendicular to the lift lever (i.e., $\alpha = 0°$). As $\alpha$ increases the effective driving force decreases, as this is given by F cos $\alpha$; where F is the driving force of the gas strut at any particular extension. Thus, it can be seen that the effective driving force can be maximized at a particular portion of the gas strut's stroke by arranging for the gas strut to be perpendicular to the lift lever at that portion of the stroke and the performance of the strut can be 'tuned' to system requirements. In view of this, a plurality of optional connecting positions 34, 34', 34", ... could be provided in the boom (see FIG. 5b) for the end of the gas strut not connected to the lift lever.

Figure 6A:
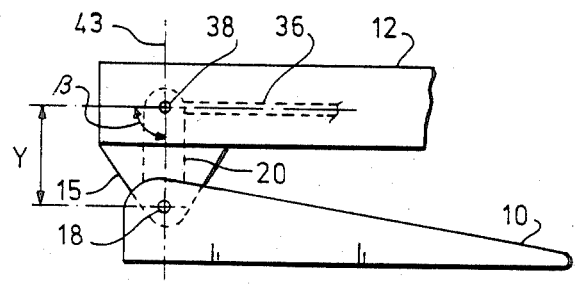
Figure 6B:
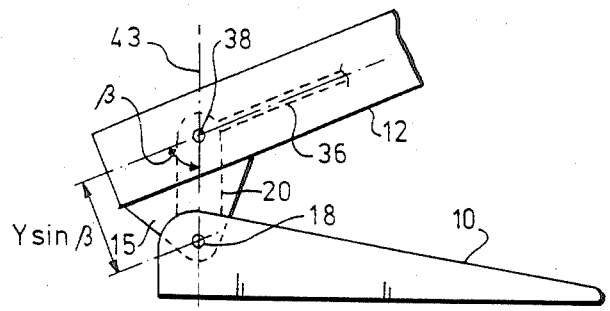
Figure 6C:
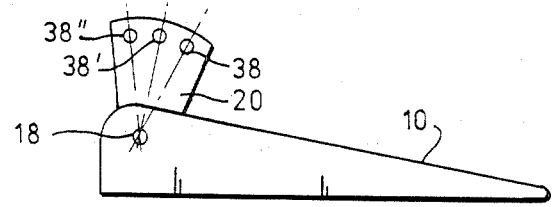

The system can also be tuned by the selection of the angle $\beta$ between the axis of the lift rod 36 and an imaginary line 43 joining the mount/boom axis 18 to the position 38 at which the lift rod is connected to the crank 20 (see FIG. 6a). If Y is the distance from the lift rod axis to the mount/boom axis 18, then the effective pulling distance of the lift rod, when the boom 12 is rotated with respect to the base 10 about the mount-/boom axis 18, is Y sin β (see FIG. 6b). The maximum effect is therefore obtained when β=90°, i.e., when the lift rod is perpendicular to the aforementioned imaginary line 43 as in FIG. 6a. By choosing the relative positions of the mount/boom axis 18 and the connecting point of the lift rod 36 to the crank 20, it is possible to further tune the system. To this end a plurality of optional connection positions 38, 38', 38", . . . for the lift rod 36 could be provided on the crank (see FIG. 6c).

Thus, the lever arrangement of the support in accordance with the present invention provides more opportunities than conventional arrangements to optimize the lifting force over the complete range of operating heights.

Figure 7:
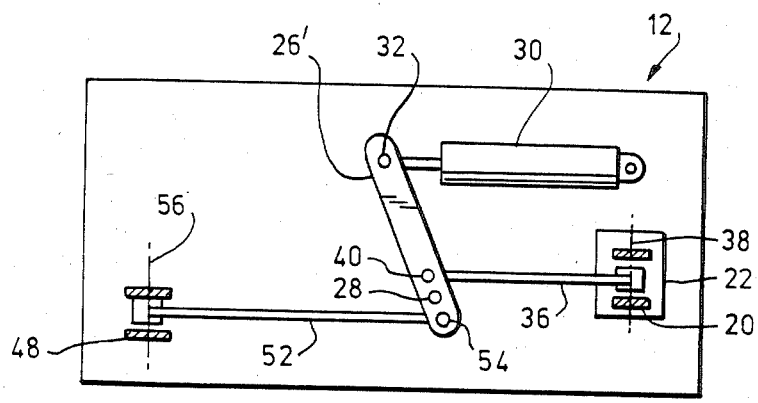
FIG. 7 is a plan view of a combined lifting and parallel motion mechanism for use in the support of FIG. 1.
Figure 8:
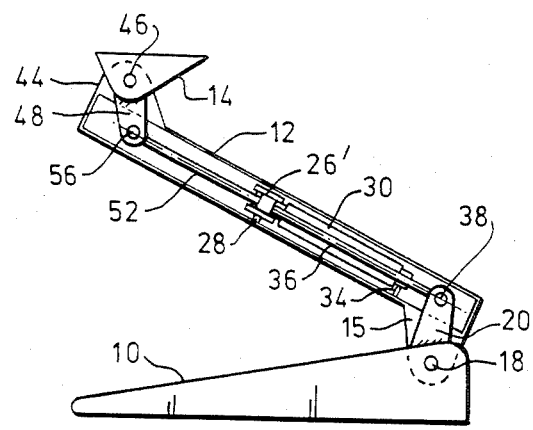
FIG. 8 is a side view of the support of FIG. 1 indicating in general terms how the mechanism of FIG. 7 can be accommodated within the boom.

As the angle of the boom to the horizontal changes in operation as the display is lifted, it is desirable that a mechanism is provided for maintaining the display at a desired viewing angle. FIGS. 7 and 8 show a simple arrangement for providing this feature. The boom is provided at its upper end with two upward facing lugs 44 which pass through slots (not shown) in the display platform 14. It is by means of these lugs 44 that the platform is hinged to the lift boom about a boom/platform axis 46 which is parallel to the mount/boom axis 18. The platform is also formed with downward facing lugs 48 for providing a platform crank 48 which pass through a hole (not shown) in the upper surface of the boom. As shown in FIG. 7, the lift lever 26 of FIG. 2 is modified to provide an extension beyond the pivot point 28. A parallel motion linkage in the form of a parallel motion rod 52 is connected between a point 54 on the extended lift lever 26' and a position 56 on the platform crank 48. The locations of the point 54 and the position 56 are so chosen to maintain the platform, and consequently the display, at a constant orientation to the horizontal. If, for example, the distance between the connecting position 38 of the lift rod to the base lugs and the mount/boom axis 18, and the distance between the connecting position 56 of the parallel motion rod to the platform crank and the boom/platform axis 46 are so chosen to be equal, at any particular angle of the boom, then the connecting points 40 and 54 should be equidistant from, but on opposite sides of the pivot point 28. With a combined lift and parallel motion mechanism, the lift force required from the lift gas strut is unaffected by changing the position of the center of gravity of the display. FIG. 8 illustrates how the lift and parallel motion mechanisms are contained within the boom.

It is also desirable to provide a tilt mechanism for the display so that the viewing angle can be changed irrespective of the boom inclination. This could be done by providing a mechanism whih is completely independent of the lift and parallel motion mechanism. However, the tilt mechanism can also be combined with the lift and parallel motion mechanism as illustrated hereinafter with reference to two alternative arrangements.

Figure 9:
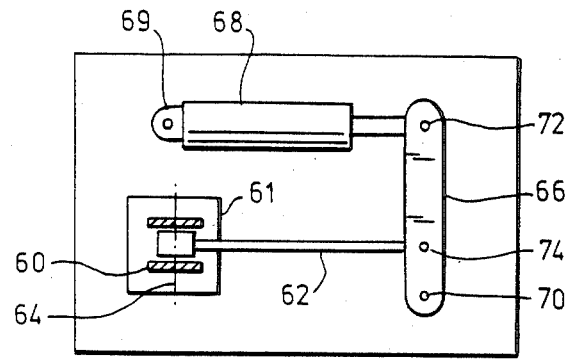
FIG. 9 is a plan view of a tilt mechanism for use in the support of FIG. 1.
Figure 10:
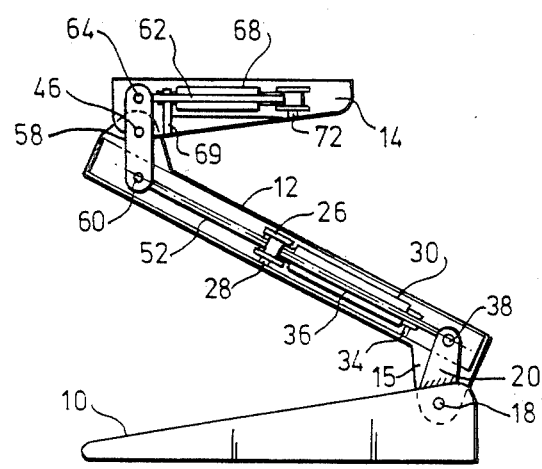
FIG. 10 is a side view of the support of FIG. 1 indicating in general terms how the mechanism of FIG. 7 and that of FIG. 9 can be accommodated in the boom and in the platform respectively.

In one of those arrangements, shown in FIGS. 9 and 10, the tilt mechanism is housed in the platform 14. In this arrangement, the platform lugs 48 (FIGS. 7 and 8) are replaced by an idler arm 58 which is pivotally mounted to rotate about the boom/platform axis 46. In practice, the idler arm 58 remains more or less vertical while the angles of the boom and the platform change. The parallel motion rod 52 (cf. FIG. 7) is connected to the lower end of the idler arm at a position 60 displaced from the boom/platform axis 46. A tilt rod 62 is connected to the other end of the idler arm at a position 64, the connecting positions 60 and 64 relative to the boom/platform axis being chosen such that the platform maintains the orientation set, as the boom angle changes.

The tilt mechanism, which comprises the tilt rod 62, tilt lever 66 and a tilt gas strut 68, operates in essentially the same way as the corresponding lift mechanism comprising the lift rod 36, lift lever 26 and the gas strut 30. The operation of the tilt mechanism will therefore not be described in further detail. A brief explanation of the forces produced when a display is tilted is, however, given below with reference to FIGS. 11a, 11b and 11c.

Figure 11A:
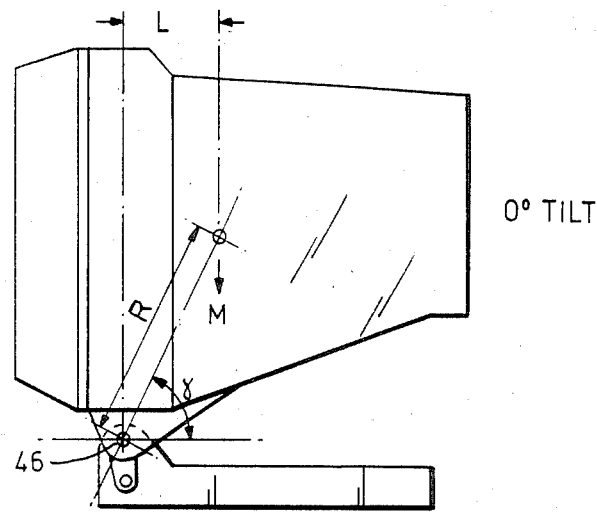
FIGS. 11a, 11b and 11c are used to explain the operation of the tilt mechanism of FIG. 9.
Figure 11B:
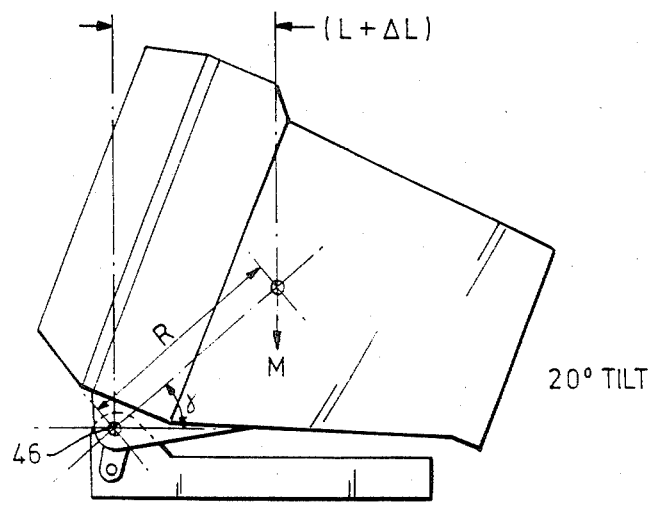

FIGS. 11a and 11b show a display at 0° and 20° tilt respectively. This is a typical requirement of display users. If L is the horizontal distance at 0° tilt (FIG. 11a) of the display's center of mass from the axis 46 about which the display pivots and L+ΔL is the corresponding distance at 20° tilt (FIG. 11b), then the turning moment=

M·L at 0° and

M·(L+ΔL) at 20°

(where M is the mass of the display).

Figure 11C:
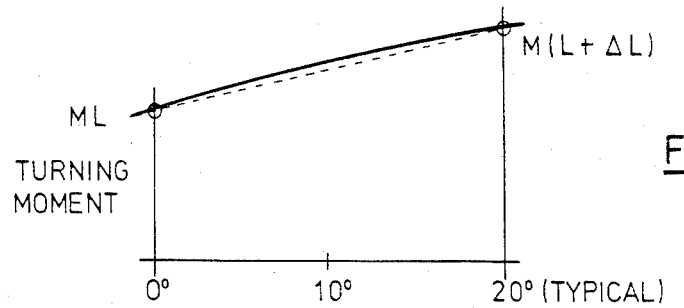

The force diagram gradient shown in FIG. 11c therefore has to be matched closely by the tilt linkage mechanism (including the tilt gas strut) output forces. In order to achieve this, the tilt linkage mechanism is set up bearing in mind the various aspects discussed for the lift mechanism with respect to FIGS. 3a to 6c. Thus the tilt mechanism could include a plurality of optional connecting points for the tilt rod and the tilt gas strut on the idler arm, on the tilt lever and in the platform, as appropriate. Although the horizontal distance between the display's center of mass and the axis 46, and accordingly the turning moment, varies according to a cosine rule ΔL α R Cos γ (R=distance from the axis to the center of mass and γ=the angle of an imaginary line between the axis and the center of mass to horizontal), the turning moment curve can be considered to be approximately linear where the total angle swept due to display adjustment does not exceed 25° and the angle γ is within the range 20° to 60°. Outside this range special gas struts with high rates would be required.

The other of the aforementioned arrangements comprising a lift, a parallel motion and a tilt mechanism is described with reference to FIGS. 12 and 13. This arrangement is particularly compact as the lift, parallel motion and tilt mechanisms are all integrated in the boom. The lift gas strut 30 is connected at one end to a predetermined position 34' in the boom 12 and is pivotally connected at the other end to a point 32 on the lift lever 26". The lift lever 26", which is mounted about an axis 28 fixed with respect to boom 12, is pivotally connected to one end of the lift rod 36, whose other end is connected at a position 38 to the base crank 20. The lift lever 26" is also connected to a combined parallel linkage and tilt mechanism at the point 54. As discussed with reference to FIGS. 7 and 8, the relative positions of the connection points 54 and 40 with respect to the pivot point 28 of the lift lever will be dependent on other related dimensions.

The parallel linkage and tilt mechanism comprises a slider plate 82, a tilt gas strut 68', a tilt lever 66' which is provided with a hollow portion 96 for the passage of the lift rod 36, and a tilt rod 62'. The tilt lever 66' is pivotally mounted at a fixed location 70' on the slider plate 82. Studs 76, which engage slots in the slider plate, are provided in the boom for guiding the plate.

The tilt gas strut 68' is pivotally connected at one end to a predetermined point 72' on the tilt lever 66' and is further connected at the other end to a predetermined position on the slider plate 82, which in this specific arrangement is the position at which the lift lever is connected to the slider plate. The tilt rod 62' is connected between a predetermined point 74' on the tilt lever 66' and a predetermined position 56 on the platform crank 48. The tilt rod passes through a hollow portion 94 of the lift lever 26". In this arrangement the platform 14 is the same as that shown in FIG. 8.

The lift mechanism and the tilt mechanism are both balanced systems in their own right, and due to the inherent stiffness of the mechanisms they operate independently of one another.

To raise the display height, the operator merely has to apply a slight upward force on the display to "lighten the load" on the system and to temporarily take the lift mechanism out of balance. The effect of this is that the lift gas strut 30 extends under its internal pressure. The lift lever 26" is thereby allowed to rotate anti-clockwise (as seen in FIG. 12) about the pivot point 28 forcing the slide plate 82 to the right as seen in the Figure. As the tilt mechanism is in balance with the display at its current tilt angle and as the tilt mechanism is mounted on the slide plate 82, the tilt mechanism moves with the slider causing the tilt rod to act on the platform 14 to maintain the desired tilt angle (i.e., the tilt mechanism and the slide plate act together as a parallel linkage). When the user releases the display (i.e., when he ceases to exert an upward force) the display stays at the desired height because the lift system is once more balanced. To lower the display height, the operator merely applies a slight downward force on the display until the desired height is reached.

If the user applies a force so as to tilt the display about the second axis 46, this changes the rotational force and takes the "tilt system" out of balance. The extension of the tilt gas strut changes accordingly. When the user releases the display, the tilt system is balanced in the new position. As this balancing of forces takes place within the tilt mechanism (tilt rod 62', tilt lever 66' and tilt gas strut 68') on the slide plate, the slide plate 82 and the balanced lift mechanism do not move.

Figure 12:
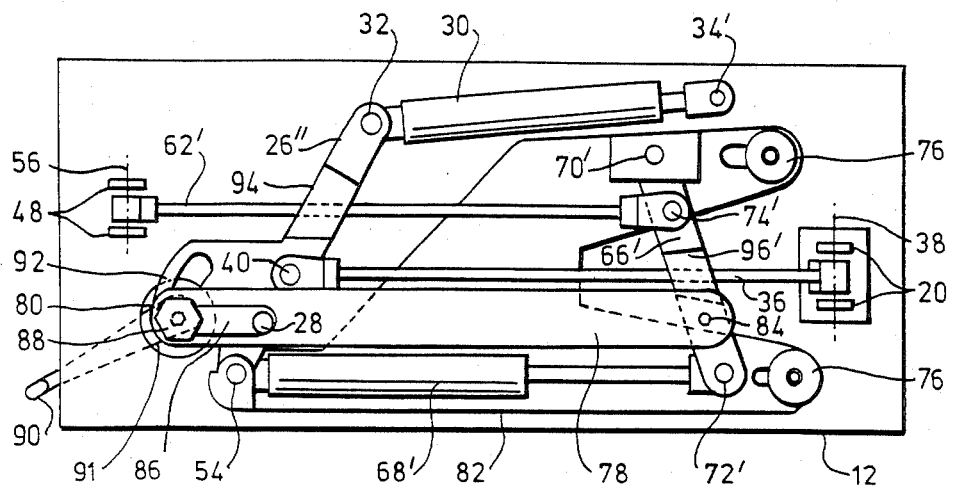
FIG. 12 is a plan view of a combined lift, parallel motion and tilt mechanism for use in the support of FIG. 1.

FIG. 12 also shows a locking mechanism for the lift, tilt and parallel motion mechanisms. This comprises a locking plate 78 which is connected to the tilt lever 66' at 84 and is formed with a slot 86. The lift lever 26" is also provided with an integral slotted extension 92. Passing through the slots in the locking plate and the extension is a screw 88 which is connected to a locking lever 90. On operating the locking lever 90, the screw urges the plate 76 and the slotted extension 92 against a locking collar 91 formed in the lift boom 12. As the lift and tilt mechanisms are balanced, only light forces are needed to lock the support apparatus in a desired position.

Although the present invention has been described with respect to variants of a specific embodiment, it will be understood that further modifications and/or additions are possible without departing from the claimed subject-matter.

Figure 13:
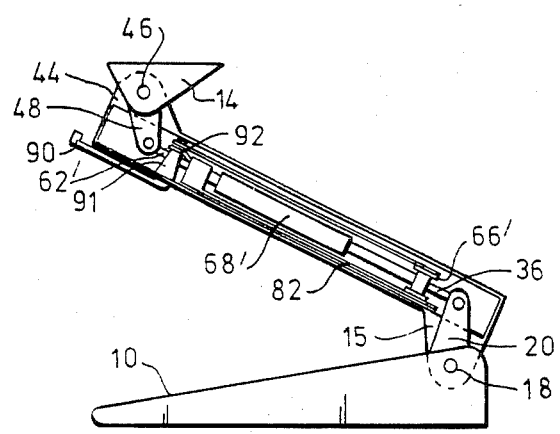
FIG. 13 is a side view of the support of FIG. 1 indicating in general terms how the mechanism of FIG. 12 can be accommodated within the boom.

In the embodiment of FIGS. 12 and 13 for example, the slide-plate 82 could be replaced by a suitably shaped rod connecting the points 54 and 70' and slidably mounted in the lift boom 12.

The platform 14 could form an integral part of the display device's housing.

The apparatus could additionally be provided with a swivel mechanism. This could, for example, take the form of a turntable which forms part of the base mount 10, or to which the mount is connected. Alternatively, or additionally, the base mount could be in the form of an edge clamp to further reduce the footprint of the apparatus.

Instead of a base mount with a boom and platform arrangement for supporting an object above the base mount, the support could comprise a mount which is for fixing to a wall or ceiling with the boom depending therefrom (i.e., a support which is essentially an inverted form of that so far described). As in the embodiments particularly described, the lift mechanism would be so arranged to urge the boom into its raised position, although in this alternative embodiment that would be the near-horizontal position. The lifting force would be so adjusted to counteract the downward force of gravity acting on the object (e.g., a CRT display) attached to a platform at the lower end of the boom, which downward force would urge the boom towards the near-vertical position. To adapt the lever mechanisms particularly described to provide a force which urges the boom to a near horizontal position is considered to be within the scope of the skilled person. This could be achieved, for example, by attaching the lift gas strut 30 and the lift rod 36 to the lift lever 26 shown in FIG. 2, at opposite sides rather than on the same side of the pivot 28.

It should be understood that the present invention, although particularly described with reference to a display device, is not limited to the supporting of such a device.

Having thus described as our invention, what we claim as new, and desire to secure by Letters Patent is:

1. A support, intended in operation to locate an object of appreciable weight at an adjustable height relative to a reference height, the support comprising:
   a mount to be located at the reference height and having a crank extending therefrom;
   a boom pivotally mounted on said mount about a mount/boom axis and extending therefrom to, and carrying, means for attaching the intended object;
   a lift lever and a lift gas strut carried wholly by the boom; and
   a lift rod mounted between a position on the crank remote from the mount/boom axis and the lift lever, the lift lever being pivotally mounted about a lift lever/boom axis fixed relative to the boom, and the lift rod and the lift gas strut both being connected to the lift lever but with the strut at a greater separation from the lift lever/boom axis than the rod, the lift gas strut engaging the boom and counteracting the effects of gravity when the support is loaded with the intended object.

2. A support as claimed in claim 1 wherein the attachment means comprise a platform for mounting the intended object, the platform being pivotally mounted on the boom about a boom/platform axis, which is substantially parallel to the mount/boom axis, and connected to the boom by a parallel motion mechanism.

3. A support as claimed in claim 2 wherein the parallel motion mechanism comprises a platform crank means and a parallel motion linkage which is connected between a position on said platform crank means remote from the boom/platform axis and a pivotal connection point on the lift lever located with respect to the lift lever/boom axis and with respect to the crank lengths so that the attitude of the platform is substantially preserved as the boom moves.

4. A support as claimed in claim 3 wherein the platform crank means comprises a fixed platform crank which extends from the platform and wherein the parallel motion linkage includes a tilt mechanism comprising:

a slide member which is slidably mounted with respect to the boom, the lift lever being pivotally connected to the slide member at the pivotal connection point;

a tilt lever and a tilt gas strut carried wholly by the slide member; and a tilt rod mounted between a position on the platform crank remote from the boom/platform axis and the tilt lever, the tilt lever being pivotally mounted about a tilt lever slide member axis fixed relative to the slide member, and the tilt rod and the tilt gas strut both being connected to the tilt lever but with the tilt gas strut at a greater separation from the tilt lever/slide member axis than the tilt rod, the tilt gas strut engaging the slide member and counteracting the turning moment caused by weight of the intended object when loaded on the platform.

5. A support as claimed in claim 4 comprising a locking mechanism for locking the support in use with the object located at an intended height and with an intended inclination.

6. A support as claimed in claim 5 wherein the locking mechanism comprises a locking plate which is pivotally connected to the tilt lever and is formed with a slot, an integral slotted extension to the lift lever, a locking collar which is formed in said lift boom, a clamp mechanism which extends through the slots in the locking plate and the slotted extension to the lift lever, and an actuator which, on manual operation thereof, causes said clamp mechanism to clamp the locking plate and the extension to the lift lever to the locking collar.

7. A support as claimed in claim 3 wherein the platform crank means comprises an idler crank arm which is rotatably mounted about the boom/platform axis and wherein the platform is provided with a tilt mechanism comprising:

a platform tilt lever and a platform tilt gas strut carried wholly by the platform; and a platform tilt rod mounted between a position on the idler crank remote from the boom/platform axis and the platform tilt lever, the tilt lever being pivotally mounted about a platform tilt lever/platform axis fixed relative to the platform, and the platform tilt rod and the platform tilt gas strut both being connected to the platform tilt lever but with the platform tilt gas strut at a greater separation from the platform tilt lever/platform axis than the platform tilt rod, the platform tilt gas strut engaging the platform and counteracting the turning moment caused by the weight of the intended object when loaded on the platform.

8. A support as claimed in claim 1 wherein a plurality of optional mounting points for the gas strut is provided on the elements with which it cooperates.

9. A support as claimed in claim 2 wherein a plurality of optional mounting points for the gas strut is provided on the elements with which it or they cooperate.

10. A support as claimed in claim 3 wherein a plurality of optional mounting points for the gas strut is provided on the elements with which it cooperates.

11. A support as claimed in claim 4 wherein a plurality of optional mounting points for one or more of the gas struts are provided on the elements with which it or they cooperate.

12. A support as claimed in claim 5 wherein a plurality of optional mounting points for one or more of the gas struts are provided on the elements with which it or they cooperate.

13. A support as claimed in claim 6 wherein a plurality of optional mounting points for one or more of the gas struts are provided on the elements with which it or they cooperate.

14. A support as claimed in claim 7 wherein a plurality of optional mounting points for one or more of the gas struts are provided on the elements with which it or they cooperate.

15. A support as claimed in claim 1 wherein a plurality of optional predetermined connecting positions for said lift gas strut are provided in said lift boom.

16. A support as claimed in claim 2 wherein a plurality of optional predetermined connecting positions for said lift gas strut are provided in said lift boom.

17. A support as claimed in claim 3 wherein a plurality of optional predetermined connecting positions for said lift gas strut are provided in said lift boom.

18. A support as claimed in claim 4 wherein a plurality of optional predetermined connecting positions for said lift gas strut are provided in said lift boom.

19. A support as claimed in claim 5 wherein a plurality of optional predetermined connecting positions for said lift gas strut are provided in said lift boom.

20. A support as claimed in claim 6 wherein a plurality of optional predetermined connecting positions for said lift gas strut are provided in said lift boom.

21. A support as claimed in claim 7 wherein a plurality of optional predetermined connecting positions for said lift gas strut are provided in said lift boom.

22. A support as claimed in claim 8 wherein a plurality of optional predetermined connecting positions for said lift gas strut are provided in said lift boom.

23. A support as claimed in claim 1 wherein the crank comprises a plurality of optional connecting positions displaced from the mount/boom axis for the lift rod.

24. A support as claimed in claim 2 wherein the crank comprises a plurality of optional connecting positions displaced from the mount/boom axis for the lift rod.

25. A support as claimed in claim 3 wherein the crank comprises a plurality of optional connecting positions displaced from the mount/boom axis for the lift rod and/or said platform crank means comprises a plurality of optional connecting positions displaced from the boom/platform axis for the tilt lever or platform tilt lever as appropriate.

26. A support as claimed in claim 4 wherein the crank comprises a plurality of optional connecting positions displaced from the mount/boom axis for the lift rod and/or said platform crank means comprises a plurality of optional connecting positions displaced from the boom/platform axis for the tilt lever or platform tilt lever as appropriate.

27. A support as claimed in claim 5 wherein the crank comprises a plurality of optional connecting positions displaced from the mount/boom axis for the lift rod and/or said platform crank means comprises a plurality of optional connecting positions displaced from the boom/platform axis for the tilt lever or platform tilt lever as appropriate.

28. A support as claimed in claim 6 wherein the crank comprises a plurality of optional connecting positions displaced from the mount/boom axis for the lift rod and/or said platform crank means comprises a plurality of optional connecting positions displaced from the boom/platform axis for the tilt lever or platform tilt lever as appropriate.

29. A support as claimed in claim 7 wherein the crank comprises a plurality of optional connecting positions displaced from the mount/boom axis for the lift rod and/or said platform crank means comprises a plurality of optional connecting positions displaced from the boom/platform axis for the tilt lever or platform tilt lever as appropriate.

30. A support as claimed in claim 8 wherein the crank comprises a plurality of optional connecting positions displaced from the mount/boom axis for the lift rod.

31. A support as claimed in claim 9 wherein the crank comprises a plurality of optional connecting positions displaced from the mount/boom axis for the lift rod.

32. A support as claimed in claim 1 wherein the intended object is a display device.

33. A support as claimed in claim 2 wherein the intended object is a display device.

34. A support as claimed in claim 3 wherein the intended object is a display device.

35. A support as claimed in claim 4 wherein the intended object is a display device.

36. A support as claimed in claim 5 wherein the intended object is a display device.

37. A support as claimed in claim 6 wherein the intended object is a display device.

38. A support as claimed in claim 7 wherein the intended object is a display device.

39. A support as claimed in claim 8 wherein the intended object is a display device.

40. A support as claimed in claim 9 wherein the intended object is a display device.

41. A support as claimed in claim 10 wherein the intended object is a display device.

42. A support as claimed in claim 23 wherein the intended object is a display device.

43. A support as claimed in claim 1 in combination with a display device.

44. A support as claimed in claim 4 in combination with a display device.

45. A support as claimed in claim 15 in combination with a display device.

46. A support as claimed in claim 23 in combination with a display device.

47. A support as claimed in claim 32 in combination with a display device.

* * * * *